United States Patent [19]

Wille

[11] 4,040,202
[45] Aug. 9, 1977

[54] FISHING TACKLE STORAGE CASE

[76] Inventor: Richard M. Wille, 15355 Kata Drive, Brookfield, Wis. 53005

[21] Appl. No.: 696,043

[22] Filed: June 14, 1976

[51] Int. Cl.² ............................................. A01K 97/06
[52] U.S. Cl. ................................................. 43/57.5 A
[58] Field of Search ........... 43/57.5 R, 57.5 A, 54.5 R

[56] References Cited

U.S. PATENT DOCUMENTS

| 674,984 | 5/1901 | Plumley | 43/57.5 R |
| 1,339,231 | 5/1920 | Stewart | 43/57.5 A |
| 1,737,376 | 11/1929 | Knettles | 43/57.5 A |

Primary Examiner—Warner H. Camp
Attorney, Agent, or Firm—Joseph J. Jochman, Jr.

[57] ABSTRACT

A generally open frame member has a series of coil springs attached by their ends to threaded studs on the interior of the frame. The opposite free ends of the springs are each opened for the attachment of one end of a lure, the other end of which is hooked, under tension of the spring, to a spaced fixed attachment means or to an oppositely mounted spring. Each frame is adapted to be attached to one or more identical frames by demountable hinges and the two outermost frames are provided with covers to give a completely enclosed storage case.

8 Claims, 3 Drawing Figures

U.S. Patent     Aug. 9, 1977     4,040,202
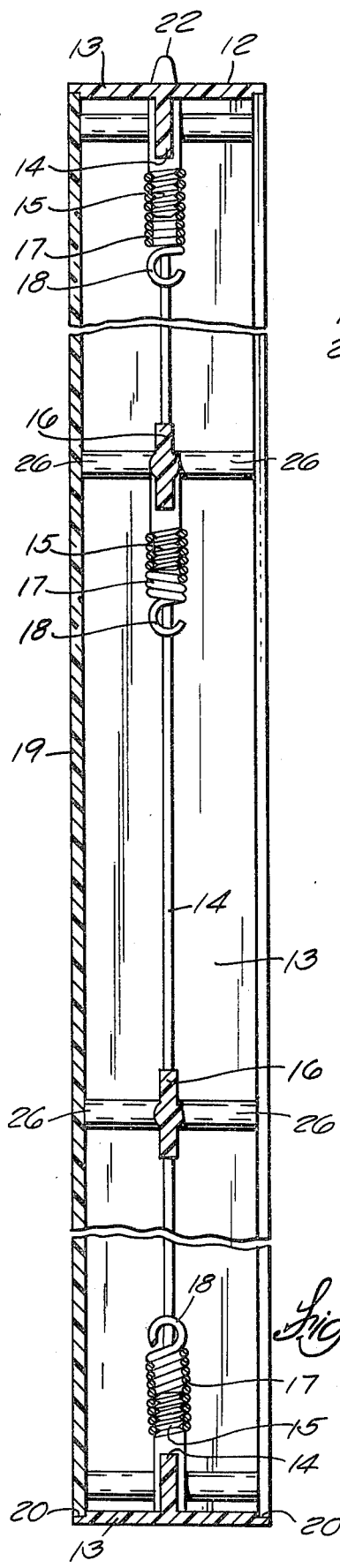
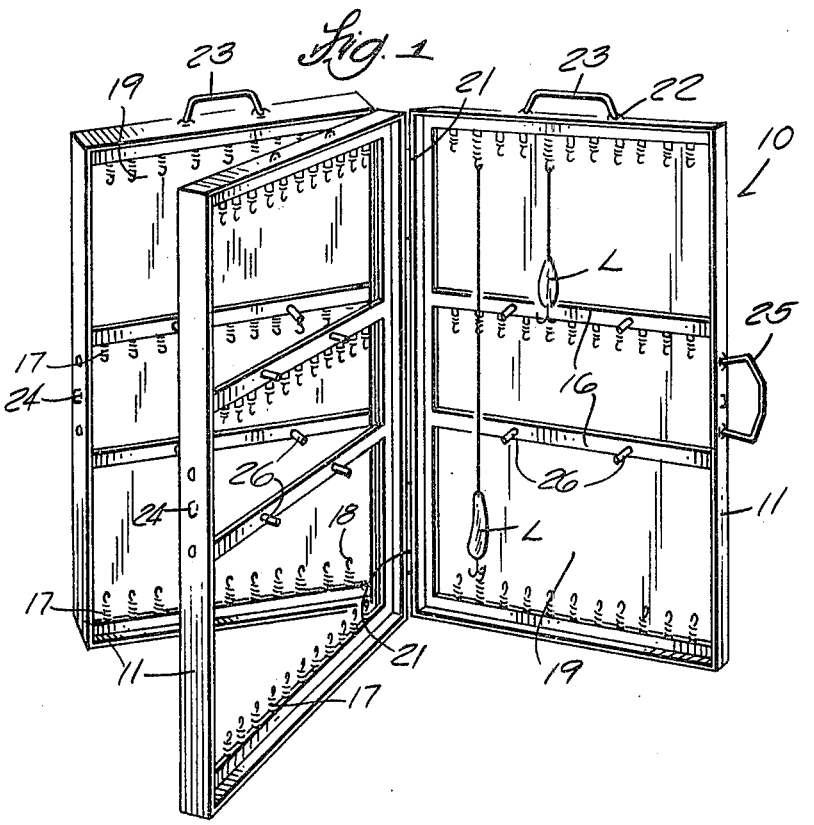
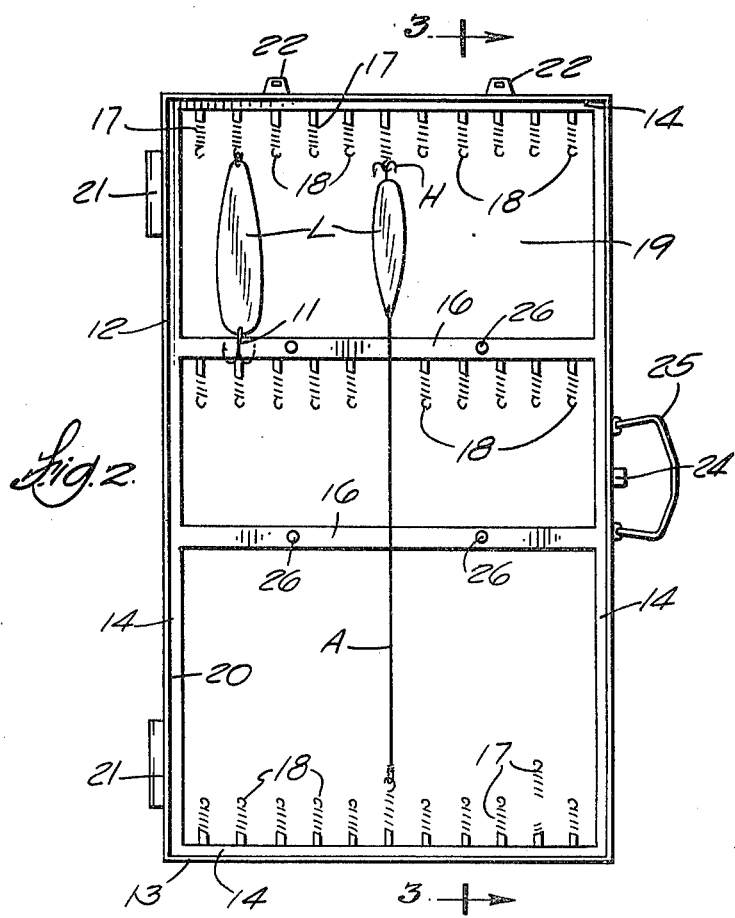

FISHING TACKLE STORAGE CASE

BACKGROUND OF THE INVENTION

1. Field of the Invention

The present invention pertains to the art of fishing tackle boxes and similar types of cases used for the storage of fishing lures and the like.

2. Description of the Prior Art

Fishing tackle storage boxes are well known in the art and are made in a wide variety of types and sizes. Most commonly, such tackle boxes are divided into a number of interior compartments of varying sizes so that tackle and lures of different kinds and sizes can be separated for ease of selection and to avoid entangling of the usual hooks, leaders, attachments and the like which are normally a part of or used with such equipment. It is not practical, however, to provide a separate compartment for each lure since many are often quite small. Consequently, a number of small lures or artificial baits are generally stored in the same compartment. If such lures are left unprotected, as they usually are in order to keep them readily accessible to the fisherman, they tend to be rubbed and banged together and become scratched, worn or otherwise damaged. Likewise, they may rub or be thrown against the bottom and sides of the compartments of the tackle box itself with the same damaging results. Also, since by their nature lures normally have attached thereto hooks, leaders, or other line attachment means, the problems of loose storage in compartments of a tackle box, either individually or in groups, is particularly troublesome and potentially damaging. If lures are wrapped or placed in boxes to protect them, the advantage of quick accessibility is lost, as well as some additional storage space. Furthermore, lures that are stored loose in a tackle box are subject to accidental spilling should the box be inadvertently tipped when open and in use. Also, lures may become mixed and tangled merely from the unavoidable movement caused in carrying the tackle box from place to place.

SUMMARY OF THE INVENTION

In the present invention there is provided a case for storing artificial fishing baits and lures which eliminates all of the problems attendant prior art tackle box or case constructions in which lures are loosely stored and subject to wear, damage, or tangling. The invention herein also overcomes the prior art problem of ready accessibility of lures stored in closed protective individual storage boxes or compartments. In the present invention, relatively flat frame member with a generally open interior is provided with tension spring attachment means by which the lures are suspended within the open interior and held against undesirable movement and displacement. Lures of varying shapes and sizes may be mounted within the case in relatively closely spaced relation without danger of rubbing or tangling. Lures with attached leaders may also be conveniently stored with the leaders held in the same manner against displacement and tangling. The frame members may be hingedly attached together to provide a sandwich type, multiple unit construction with the two outer frames provided with covers to form a completely enclosed storage case. Lures stored in this tackle case are open to immediate view and selection and can be easily unattached and removed from the attachment means for use.

BRIEF DESCRIPTION OF THE DRAWINGS

FIG. 1 is a perspective view of the storage case of the present invention standing open for use.

FIG. 2 is a front elevation of the frame members which comprises one of the units of the multiple unit case construction of FIG. 1.

FIG. 3 is an enlarged cross sectional view taken on line 3—3 of FIG. 2.

DESCRIPTION OF THE PREFERRED EMBODIMENT

A fishing lure storage case 10 of the present invention is shown in perspective in FIG. 1. In the embodiment shown, the case 10 comprises three similar modular units 11 hingedly connected at their edges to form a single multi unit storage case.

Each unit 11, as best shown in FIG. 2, includes a rectangular outer frame member 12. To provide structural rigidity and also the provide for the lure attachment means, the outer frame member 12 is of T shaped cross section. The top of the T forms the outer portion 13 of the frame and the leg of the T extends inwardly from the outer portion to form a continuous rib 14 around the inner periphery of the frame.

The entire frame member 12 is preferably molded of plastic and molded integrally therewith, as inwardly disposed extensions of two opposite ribs 14, are a series of spaced, parallel threaded studs 15. Also molded as an integral part of the frame 12 are one or more intermediate frame members 16 extending between the longer sides of the frame 12 and parallel to the shorter sides. Either or both of the intermediate frame members 16 may include integrally molded threaded studs 15 disposed parallel to and spaced in substantially the same manner as the studs extending from the ribs 14. In the preferred embodiment shown, one intermediate member 16 has threaded studs 15 extending from one edge and the other had no studs. The intermediate members are of generally cruciform cross section, also for the dual purpose of providing structural rigidity and a convenient means for attaching lures.

A helical tension spring 17 is threaded onto the end of each stud 15. The springs must have a pitch diameter approximately equal to that of the threads on the studs 15 to provide both ability to thread the springs onto the studs by hand and a relatively secure hold by the springs on the studs when the springs are under tension. Each spring must be somewhat longer than the stud onto which it is threaded and thus, if the spring is fully threaded onto the stud such that it abuts or bottoms on the rib 14, a substantial portion of the opposite end of the spring is free to be extended under tension. The first coil of the free end of the spring 17 is bent and opened to form a hook 18 for the attachment of one end of a lure L, as is best shown in FIG. 2. The other end of the lure is hooked or attached under the tension of spring 17 to either an intermediate frame member 16 or an oppositely extending spring, depending on the length of the lure or the attachment to the lure of auxiliary tackle such as a leader A or the like. The end of the lure L to which the hook H is attached is usually most conveniently attached to one of the intermediate members, as illustrated by way of example only in FIG. 2. Of course, the hook H of the lure L may also be attached to the hook 18 in the end of a spring 17, as also shown in FIG. 2. However, one feature of the present invention contemplates utilizing the inherent attaching capability of the hooked end of the lure to one of the rigid intermediate members 16, so that only a single spring, to which the other end is hooked, is normally required for each lure. In this manner, the maximum storage capacity of the case may be attained.

A lure mounted in the case 10, as described above, is held securely enough by tension of the spring 17 so that it does not strike or rub against an adjacent lure. Yet the spring tension is easily overcome to allow simple and rapid removal of a lure. Also, open or unused springs are stiff enough so they will not interfere with or foul an adjacent mounted lure. Also, the fact that the hooks of the lures are positively mounted keeps them from becoming dull from rubbing on other lures or the interior of the case, and the danger to a fisherman of an open hook is substantially lessened.

A singular modular unit 11 could by itself provide a storage case for lures of substantial utility. It is desirable, however, to provide a case which can be completely enclosed and still provide ready accessibility to the lures. Thus, a cover 19 is provided for the front and back units 11 which comprise a part of the case assembly 10. The cover 19 is a relatively thin sheet, preferably plastic, which is adapted to fit and be secured into a recess 20 formed in the edge of the outer portion 13 of the T shaped frame member 12. In this way, both the front and back covers of the case 10 are, in themselves, fully functional storage units and may be hinged together directly with the intermediate unit 11, shown in FIG. 1, eliminated.

Each unit 11 is equipped with identical hinge assemblies 21 which are adapted to interfit with the assemblies of an adjacent unit and to be held with a demountable hinge pin (not shown). A case 10 with any number of intermediate units can thus be assembled. All units 11 of such a case are identical in all respects, except that the covers 19 are eliminated on all intermediate units.

Each unit is additionally provided with integrally molded handle connectors 22 into which wire handles 23 may be conveniently attached, generally only on the front and back cover units. Additionaly, integrally molded closure connectors 24 are provided on the front face of the frame 12 which are adapted to receive a simple snap lock wire closure 25 that cooperates with a portion of the closure connector 24 on the adjacent unit to hold such adjoining units closed.

Since the cover 19 is relatively thin and quite flexible, it has been found to be desirable to provide additional intermediate support to the otherwise wide span which the over must bridge across the frame member 12. Therefore, molded integrally with and extending perpendicularly outwardly in opposite directions from the intermediate frame members 16 are a number of support studs 26. Each of the support studs 26 is of a length just sufficient to abut the inner surface of the cover 19 when it is mounted in the recess 20 in the outer edge of the frame member. A suitable adhesive, such as that used to secure the cover in the recess, may also be applied to the outer end of each support stud against which the cover abuts. The support studs 26 which extend in the opposite direction and are not used to provide additional support to the cover, are adapted to abut like support studs extending from the next adjacent unit 11 and thus provide a positive intermediate support to the entire case 10.

While the invention has been shown and described in its preferred embodiment for the storage of fishing tackle, it will be appreciated that the invention, as hereinafter claimed, is useful for the storage of a wide variety of other types of objects and, thus, the embodiment described is not to be considered exclusive but merely exemplary.

What is claimed is:

1. A case for the storage of fishing lures and the like comprising:
   a. an outer frame member;
   b. first attachment means mounting helical tension springs to the interior of said outer frame member, said first attachment means comprising a threaded stud for each spring having a pitch diameter approximately equal to the diameter of the spring;
   c. second attachment means on the interior of said frame member opposite said first attachment means; and,
   d. said tension springs each being demountably threaded by one of its ends to one of said threaded studs such that the opposite end of the spring is free, the first coil of the opposite end being opened to provide attachment for one end of a lure, whereby the other end of the lure may be attached to said second attachment means and held against displacement by spring tension.

2. A case as defined in claim 1 wherein said outer frame member is rectangular and said first attachment means is affixed to one side of said frame.

3. The invention of claim 2 wherein said second attachment means is affixed to the side of said frame opposite said one side.

4. The invention of claim 3 wherein said first and second attachment means are identical.

5. The invention of claim 2 wherein said second attachment means comprises an intermediate frame member extending between opposite sides of said frame, parallel to and spaced from said one side of said frame.

6. A case as defined in claim 2 comprising:
   a. a back cover enclosing the rear of said frame member; and,
   b. a front cover enclosing the front of said frame member and being attached at its edge by hinges to one of the sides of said frame.

7. The invention of claim 6 wherein said back cover and said front cover are identical.

8. The invention of claim 7 wherein said hinges are demountable.

* * * * *